April 7, 1942.  E. DAVIS  2,279,160

HYDRAULIC MOTION CONTROLLING GOVERNOR OR CHECK

Original Filed March 24, 1939  2 Sheets-Sheet 1

INVENTOR.
ERNEST DAVIS
BY Bodell and Thompson
ATTORNEYS.

April 7, 1942.                E. DAVIS                2,279,160
           HYDRAULIC MOTION CONTROLLING GOVERNOR OR CHECK
              Original Filed March 24, 1939    2 Sheets-Sheet 2
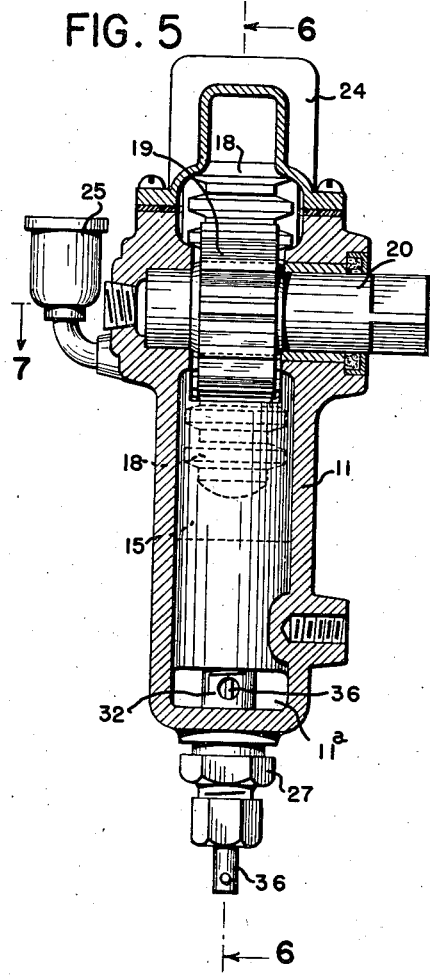
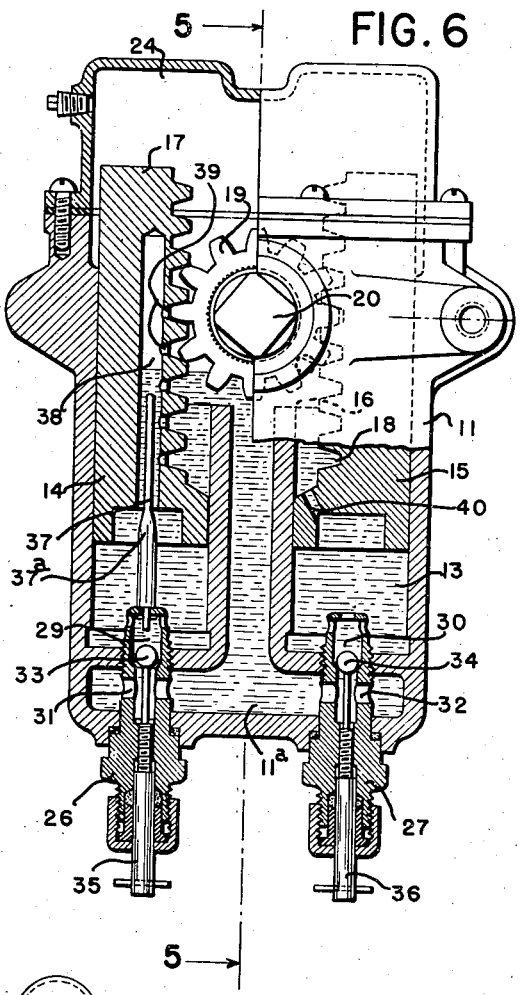
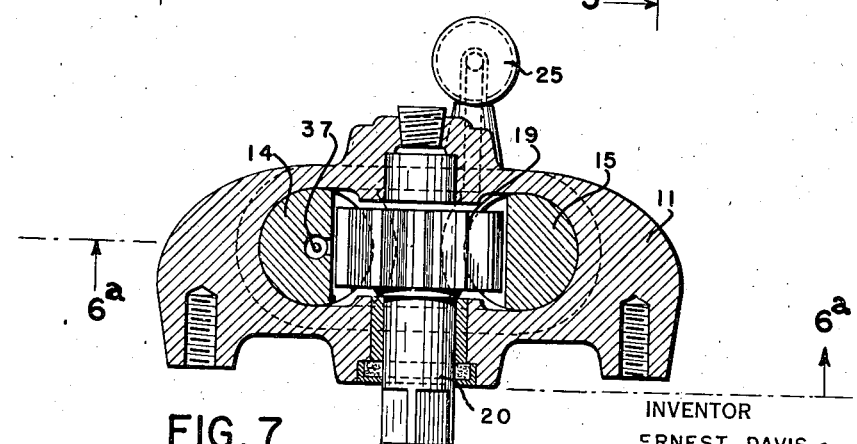
INVENTOR
ERNEST DAVIS
BY Bodell and Thompson
ATTORNEYS Patented Apr. 7, 1942

2,279,160

UNITED STATES PATENT OFFICE 2,279,160

HYDRAULIC MOTION CONTROLLING GOVERNOR OR CHECK

Ernest Davis, Syracuse, N. Y., assignor to The Prosperity Company, Inc., Syracuse, N. Y., a corporation of New York Original application March 24, 1939, Serial No. 263,961. Divided and this application June 4, 1940, Serial No. 338,785

7 Claims. (Cl. 188—94)

This invention relates to hydraulic governors, checks or motion controlling devices, and has for its object a hydraulic motion controlling governor or check for controlling or governing movement of an element or mechanism of a machine, apparatus, etc., in reverse directions, and providing a different control for the movement in one direction from in the other direction.

It further has for its object a hydraulic motion controlling governor or check including reversely movable plungers or pistons movable in parallel paths, one plunger or piston controlling the movement in one direction, and the other, the movement in the other direction, with adjustable means for individually adjusting the checking or governing movement of each plunger or piston.

It further has for its object a hydraulic governor in which the oppositely movable plungers or pistons are actuated by a rocking or reversely movable motion transmitting member interposed between the plungers and connectable to an actuator on a machine or apparatus, the movements of which are to be controlled, governed or checked, and more specifically, plungers formed with racks on their opposing faces and meshing with a pinion at diametrically opposite sides thereof.

It further has for its object a hydraulic motion controlling governor or check consisting of a casing or reservoir with the movable plungers therein, which can be readily connected to the machine or apparatus and the motion transmitting member readily coupled to the moving part of the machine, and also the adjustments readily made from the outside of the casing to control the checking effect.

The invention consists in the novel features and in the combinations and constructions hereinafter set forth and claimed.

In describing this invention, reference is had to the accompanying drawings in which like characters designate corresponding parts in all the views.

Figure 5 is an enlarged vertical sectional view taken substantially centrally of the check or on line 5—5, Figure 6.

Figure 6 is a sectional view taken on line 6—6, Figure 5, or on line 6a—6a, Figure 7.

Figure 7 is a sectional view taken on line 7—7, Figure 5.

Figure 3:
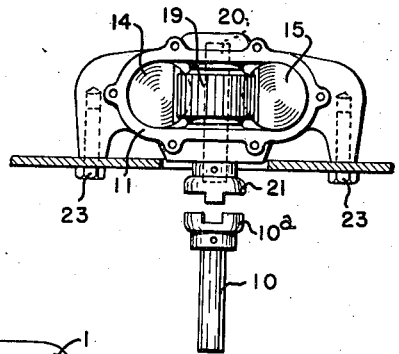
Figure 3 is a sectional view on line 3—3, Figure 2, the top or cap of the casing being removed.

The invention is here shown as applied to a garment or laundry pressing machine, in which the head has a closing movement from wide open position into closed position against a resilient padding on the lower pressing element or buck, and a reverse opening movement. The hydraulic governor is adjusted so that one plunger thereof controls the closing movement and the other plunger, the opening movement, and in controlling the closing movement, the press head is started with a minimum of checking effect to overcome the static inertia of the head and start it in motion, to gradually check its closing movement to avoid slamming, as the head quickly closes to a position near but out of contact with the lower pressing element or buck or the work thereon, and then with no, or with a minimum of, checking movement, while the head is going under final pressure on the work on the lower pressing element or buck and is compressing the resilient padding. During the opening movement of the press, the other plunger permits a substantially uniform opening by checking the reaction of the resilient padding and of other parts under stress of the actuating mechanism, when the press starts to open, and then uniformly checking during the opening movement. The various presses in accordance with their size, etc., require different adjustments and the same press may require different adjustments from time to time to suit conditions. Other movements would require other adjustments, and one of the features of this hydraulic check is the facility with which the adjustment can be made from the outside of the casing of the hydraulic governor.

This application is a division of application of Ernest Davis, Serial Number 263,961, filed March 24, 1939.

I designates a press head having an opening and a closing movement toward a lower pressing element or buck 2 having a resilient or spring padding 3 thereon, the buck 2 being supported on a bolster or gooseneck 4 on a table 5 supported by a hollow pedestal 6. The upper pressing element or head 1 is carried in any suitable manner by the usual head-carrying lever or yoke 7 having a swinging up and down movement. The head 1 is power actuated by any suitable power mechanism including a toggle comprising links 8 and 9 pivoted respectively at their ends to a fixed point and to a motion transmitting means which transmits the straightening movement of the toggle to the head 1 through the yoke 7 and being pivoted together by a pin or spindle at the joint 10 of the toggle. The pin 10 is fixed to one of the links 8 or 9 so that the pin or spindle 10 of the toggle rotates during folding and straightening of the toggle links 8, 9. This pivot pin or spindle 10 constitutes the actuator for the movable parts or plungers of the hydraulic governor.

The governor comprises a suitable casing or reservoir 11 formed with upright plunger chambers or cylinders 12, 13 therein, and with a passage from the reservoir to the lower portions of the cylinders, pistons or plungers 14 or 15 working respectively in the chambers 12, 13, a rocking or reversely movable motion transmitting member mounted in the reservoir and operatively connected on opposite sides of its axis with the plungers 14, 15 respectively, a shaft on which the motion transmitting member is mounted, extending outside of the reservoir or casing for coupling to a movable part of the machine, in this instance, the pivot pin 10 of the joint of the toggle.

The upper portions of the walls of the chambers 12, 13 on their opposing sides are omitted at 16, and the plungers 14, 15 are provided with racks 17, 18 on their opposing sides.

The motion transmitting member is here shown as a pinion 19 meshing on diametrically opposite sides of its axis with the racks 17 and 18 respectively. The pinion is mounted on a shaft 20 extending transversely into the reservoir and having a coupling section 21 at its outer end for interlocking with a complemental coupling section 10ᵃ on the joint or pivot pin 10 of the toggle. The casing is suitably secured to a wall of the pedestal 6 in any suitable manner, as by bolts 23 with the shaft 20 extending through an opening in said wall for permitting the coupling section 21 to mate with the coupling section 22. The casing 11 is formed with a suitable removable cap or cover 24 and also with a filler cup 25. The securing points or bolts 23 are preferably located at the points of a triangle.

The passages between the reservoir and the lower portions of the chambers 12, 13 are provided in removable plugs or cages 26, 27 extending through the bottom of the casing 11 and threading into the heads at the lower ends of the chambers 12, 13, these cages being formed with passages 29, 30 respectively, which open through lateral ports 31, 32 into the casing 11. These passages are controlled by individually adjustable valves here shown as balls or heads 33, 34 mounted on axially adjustable stems 35, 36 threading into the cages 26, 27 for adjusting the heads or balls 33, 34 different distances away from their seats, and thereby adjusting the size of the ports controlled by the balls 33, 34 through which the hydraulic fluid or oil is passed from the chamber or cylinder 12, 13 back into the reservoir during the down or pressure stroke of the plunger 14 or 15. Thus, the checking effect of the plungers 14, 15 can be individually varied from the outside of the casing.

As the machine to which this hydraulic governor is shown is a pressing machine in which the closing movement is controlled differently from the opening movement, at least one of the plungers 14, 15 is shown as provided with means for adjusting the checking effect thereof differently from the other. In the illustrated embodiment of the invention, the plunger 14 effects the checking of the press head 1 during its closing movement, and the plunger 15 effects the checking during the opening movement. As before pointed out, the closing movement embodies three different stages: (a) overcome the static inertia to start the head in motion and get it under momentum. This with practically no or very little checking effect. (b) gradually checking the press head while it is moving to nearly closed position to prevent slamming; and (c) closing the press under final pressure against the work on a resilient padding with practically no checking effect. Therefore, the plunger 14, which controls the closing movement, is provided with means for bringing about three different checking effects during the closing movement. This means is here shown as a throttling pin 37 extending into a lengthwise passage 38 in the plunger 15 and being of such contour or taper, as to vary the checking effect, as the plunger 14 is moved downwardly toward the lower end of the chamber or cylinder 12. The passage 38 has laterally extending ports 39 opening through the rack or the spaces between the teeth thereof for supplying a lubricant to the rack and the pinion 19. The throttling pin 37 is here shown as mounted on the upper end of the cage 27. The throttling pin 37 is supported on the upper end of the cage 27 and is hence accessible by removing the cage.

The plunger 15, which controls the opening movement of the press head 1, is also formed with a port 40 extending lengthwise thereof from the pressure face of the plunger, this permitting the flow of oil to the rack of the plunger 15.

Figure 1:
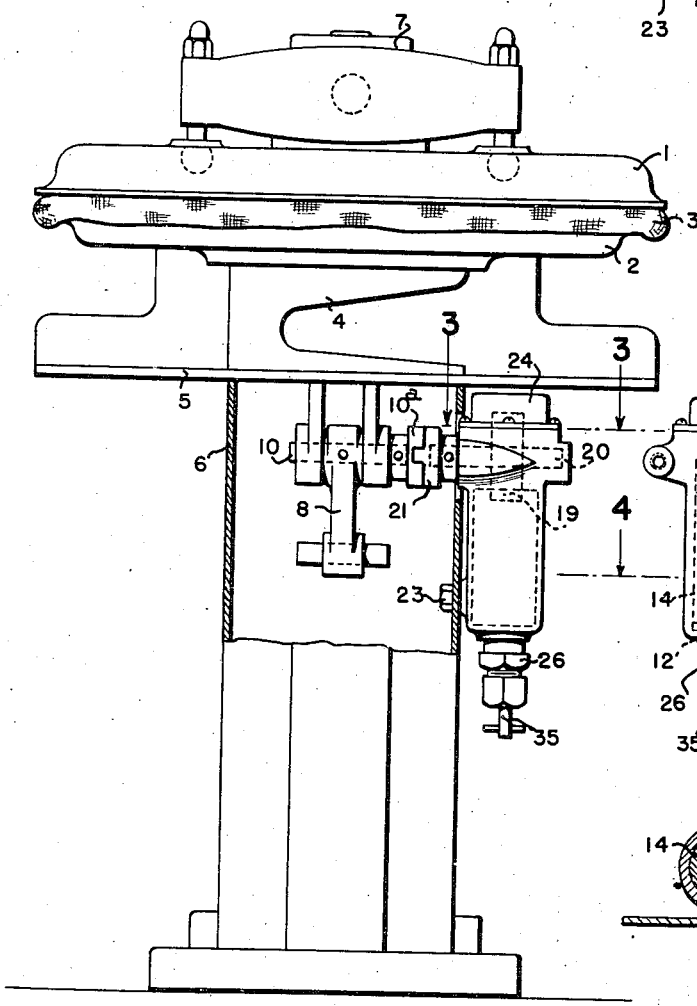
Figure 1 is an elevation of this hydraulic governor or check showing the same applied to a machine, as a garment and laundry pressing machine having an opening and a closing movement.
Figure 2:
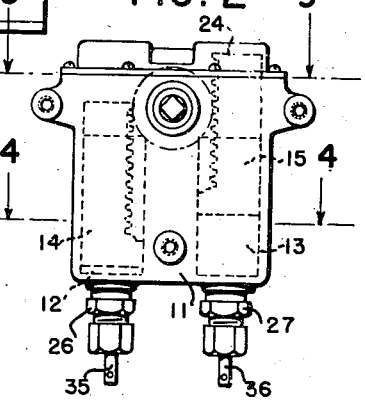
Figure 2 is an elevation of the hydraulic governor looking to the right in Figure 1, the pressing machine being omitted.
Figure 4:
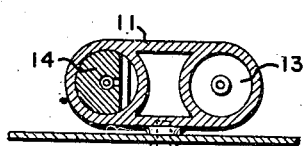
Figure 4 is a sectional view on line 4—4, Figure 2, the contiguous portion or wall of the pressing machine being shown.

In operation, with the casing 11 applied to the machine, as for instance, as shown in Figures 1, 3 and 4, and the casing filled to the proper level with the oil of the desired consistency, during the closing of the press, the plunger 14 moves downward, and the plunger 15 upward. During the starting of the downward movement of the plunger 14, the oil flows with minimum resistance through the passage 29 of the cage 27 into the reservoir and also up through the passage 38 and out through the ports 39. After the static inertia is overcome and the press head set in motion toward closed position, momentum of the head is checked by the throttling pin 37, due to the fact that the plunger moves along the throttling pin, until the tapered portion 37ᵃ thereof enters the passage 38 and thus throttles the free flow of oil through the passage 38, so that now the only outlet for the passage is through the passage 29 of the cage or plug 27 back into the reservoir past the head or ball 33, this having been initially adjusted to a predetermined open position by means of the stem 35. During the opening of the press, the plunger 14 moves retrogradely or upwardly, and the plunger 15 moves downwardly, the oil passing during this downward or pressure stroke through the port 40 substantially uniformly throughout the entire stroke and also through the passage 30 of the cage 27 past the ball 34, which is individually adjustable a predetermined distance from its seat so as to be always open a predetermined amount, and this initial adjustment can be varied, if desired, by adjusting the stem 36.

What I claim is:

1. A hydraulic governor comprising a reservoir for hydraulic fluid provided with a pair of upright chambers, plungers working in the chambers, the upper portions of the opposing sides of the chambers above the level of the pressure faces of the plungers when the latter are at the limit of their "up" strokes opening into the reservoir, the plungers being formed with racks on their opposing sides, a shaft extending transversely into the reservoir between the racks and having means for connection to a rocking actuator, a pinion mounted on the shaft within the reservoir and meshing on opposite sides of its axis with the racks, and passages for the hydraulic fluid communicating with the lower portions of the chambers respectively, one of the plungers being formed with an internal lengthwise passage opening through the pressure face thereof, and a lateral passage opening through the side thereof on which the rack is provided.

2. A hydraulic governor comprising a reservoir for hydraulic fluid provided with a pair of upright chambers, plungers working in the chambers, the upper portions of the opposing sides of the chambers above the level of the pressure faces of the plungers when the latter are at the limit of their "up" strokes opening into the reservoir, the plungers being formed with racks on their opposing sides, a shaft extending transversely into the reservoir between the racks and having means for connection to a rocking actuator, a pinion mounted on the shaft within the reservoir and meshing on opposite sides of its axis with the racks, and passages for the hydraulic fluid communicating with the lower portions of the chambers respectively, the plungers being formed with passages opening through the pressure faces thereof and also through the plungers in the rear of the pressure faces toward the sides of the plungers provided with the racks.

3. A hydraulic governor comprising a reservoir for hydraulic fluid provided with a pair of upright chambers, plungers working in the chambers, the upper portions of the opposing sides of the chambers above the level of the pressure faces of the plungers when the latter are at the limit of their "up" strokes opening into the reservoir, the plungers being formed with racks on their opposing sides, a shaft extending transversely into the reservoir between the racks and having means for connection to a rocking actuator, a pinion mounted on the shaft within the reservoir and meshing on opposite sides of its axis with the racks, and passages for the hydraulic fluid communicating with the lower portions of the chambers respectively, one of the plungers being formed with an internal lengthwise passage opening through the pressure face thereof, and a lateral passage opening through the side thereof on which the rack is provided, and a throttling pin extending lengthwise of said passage and being of a contour to vary the flow of fluid through the passage as the plunger progresses on its "down" stroke.

4. A hydraulic check comprising a casing formed with a reservoir and with a pair of upright chambers communicating at their lower ends with the reservoir, plungers reciprocally movably in said chambers respectively, and reversely movable relatively to each other, the chambers opening into the reservoir at their upper portions above the level of the pressure faces of the plungers when the latter are at the limit of their "up" strokes and the plungers having passages opening through their pressure faces and also opening into the upper portion of the reservoir, a reversely movable actuator mounted in the casing and having means for connection to a prime mover to be actuated thereby, motion transmitting means between the actuator and the plungers to move the plungers reversely relatively to each other, the actuator being a shaft extending transversely between the plungers, motion transmitting means including a gear mounted on the shaft and meshing with racks provided on opposing sides of the plungers, the plungers being formed with passages opening through their pressure faces and through the plungers in the rear of the pressure faces toward the sides of the plungers on which the racks are located, and a throttling pin extending in the passage of at least one of said plungers.

5. A hydraulic governor comprising a reservoir for hydraulic fluid provided with a pair of upright cylinders, plungers working respectively in the cylinders, a reversely movable motion transmitting member mounted between the plungers and operatively connected to the plungers to reciprocate the same oppositely to each other and having means for connection to an actuator, the cylinders having heads at their lower ends, the heads being spaced from the bottom of the reservoir, a cage separable from the reservoir and the cylinder and placeable in and removable from operative position from the outside of the reservoir and extending through the bottom of the reservoir into the head of each cylinder and provided with a passage communicating with the interior of the reservoir, and with ports opening into the cylinder, thereby providing passages connecting the reservoir and the cylinders.

6. A hydraulic governor comprising a reservoir for hydraulic fluid provided with a pair of upright cylinders, plungers working respectively in the cylinders, a reversely movable motion transmitting member mounted between the plungers and operatively connected to the plungers to reciprocate the same oppositely to each other and having means for connection to an actuator, the cylinders having heads at their lower ends, the heads being spaced from the bottom of the reservoir, a cage separable from the reservoir and the cylinder and placeable in and removable from operative position from the outside of the reservoir and extending through the bottom of the reservoir, and into the head of each cylinder and provided with a passage communicating with the interior of the reservoir, and with ports opening into the cylinder, thereby providing passages connecting the reservoir and the cylinders, and a valve for controlling the passage of the cage having means extending outside of the cage to initially adjust the valve different distances from its seat.

7. A hydraulic governor comprising a reservoir for hydraulic fluid provided with a pair of upright cylinders, plungers working respectively in the cylinders, a reversely movable motion transmitting member mounted between the plungers and operatively connected to the plungers to reciprocate the same oppositely to each other and having means for connection to an actuator, the cylinders having heads at their lower ends, the heads being spaced from the bottom of the reservoir, a cage extending through the bottom of the reservoir into the head of each cylinder and provided with a passage communicating with the interior of the reservoir, and with ports opening into the cylinder, thereby providing passages connecting the reservoir and the cylinders, and a valve for controlling the passage of the cage having means extending outside of the cage to initially adjust the valve different distances from its seat, one of the plungers being formed with a lengthwise passage opening through its pressure face and also communicating at its upper end with the reservoir, and a throttling pin supported by the cage and extending into the last-named passage.

ERNEST DAVIS.